United States Patent
Smiley

(10) Patent No.: US 10,362,890 B2
(45) Date of Patent: Jul. 30, 2019

(54) METHOD FOR SIMULTANEOUSLY PEELING AND CUTTING COOKED VEGETABLES

(71) Applicant: Hosam Khalil Smiley, Durham, NC (US)

(72) Inventor: Hosam Khalil Smiley, Durham, NC (US)

(73) Assignee: Hosam Khalil Smiley, New York, NY (US)

( * ) Notice: Subject to any disclaimer, the term of this patent is extended or adjusted under 35 U.S.C. 154(b) by 0 days.

(21) Appl. No.: 14/934,913

(22) Filed: Nov. 6, 2015

(65) Prior Publication Data

US 2017/0127870 A1 May 11, 2017

(51) Int. Cl.
*A47J 17/14* (2006.01)
*A23L 19/12* (2016.01)

(52) U.S. Cl.
CPC ............ *A47J 17/14* (2013.01); *A23L 19/12* (2016.08); *A23V 2002/00* (2013.01)

(58) Field of Classification Search
CPC ....... A47J 17/14; A23L 1/216; A23V 2002/00
See application file for complete search history.

(56) References Cited

U.S. PATENT DOCUMENTS

| | | | | | |
|---|---|---|---|---|---|
| 3,217,768 | A | * | 11/1965 | Lamb | B26D 3/185 83/404.2 |
| 3,605,647 | A | * | 9/1971 | Beck et al. | A21C 11/16 425/155 |
| 3,764,345 | A | * | 10/1973 | Beck et al. | B26D 3/185 426/506 |
| 3,782,969 | A | * | 1/1974 | Beck et al. | A21C 11/16 426/550 |
| 5,207,137 | A | * | 5/1993 | Baril | B26D 1/553 30/117 |

FOREIGN PATENT DOCUMENTS

JP 2013034463 * 2/2013

* cited by examiner

*Primary Examiner* — Anthony J Weier

(57) ABSTRACT

A system, method and device for cutting and peeling a root vegetable. The system includes a frame to receive a cooked root vegetable, a surface slidably connected to the frame to move linearly and reciprocally along at least a portion of the length of the frame, a wire assembly fixed to the frame and oriented perpendicular to the movement of the surface, and power to enable the surface to move toward the wire assembly. When the surface is activated, it moves the vegetable through the wire assembly which simultaneously cuts and removes the skin therefrom.

5 Claims, 6 Drawing Sheets

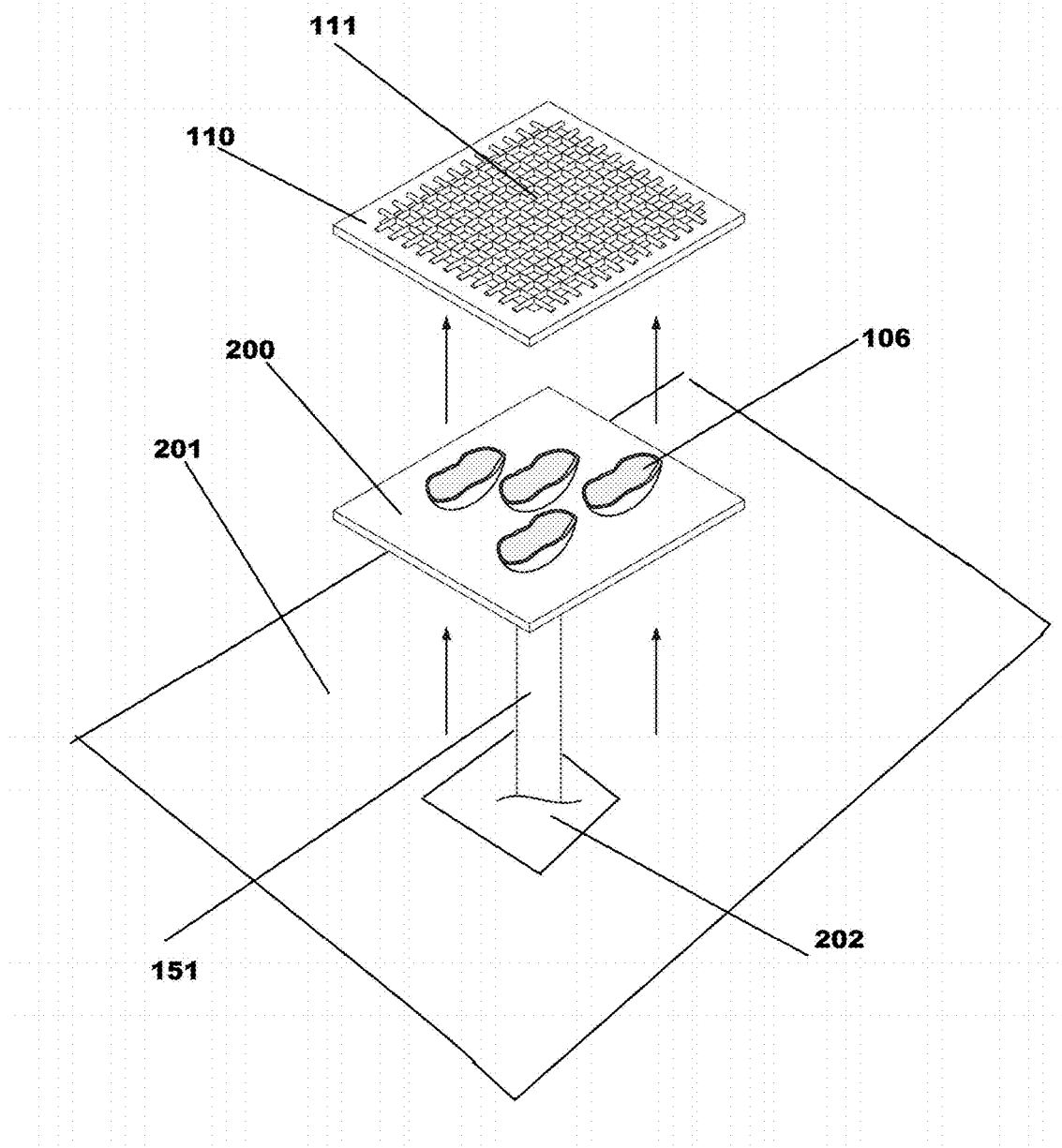

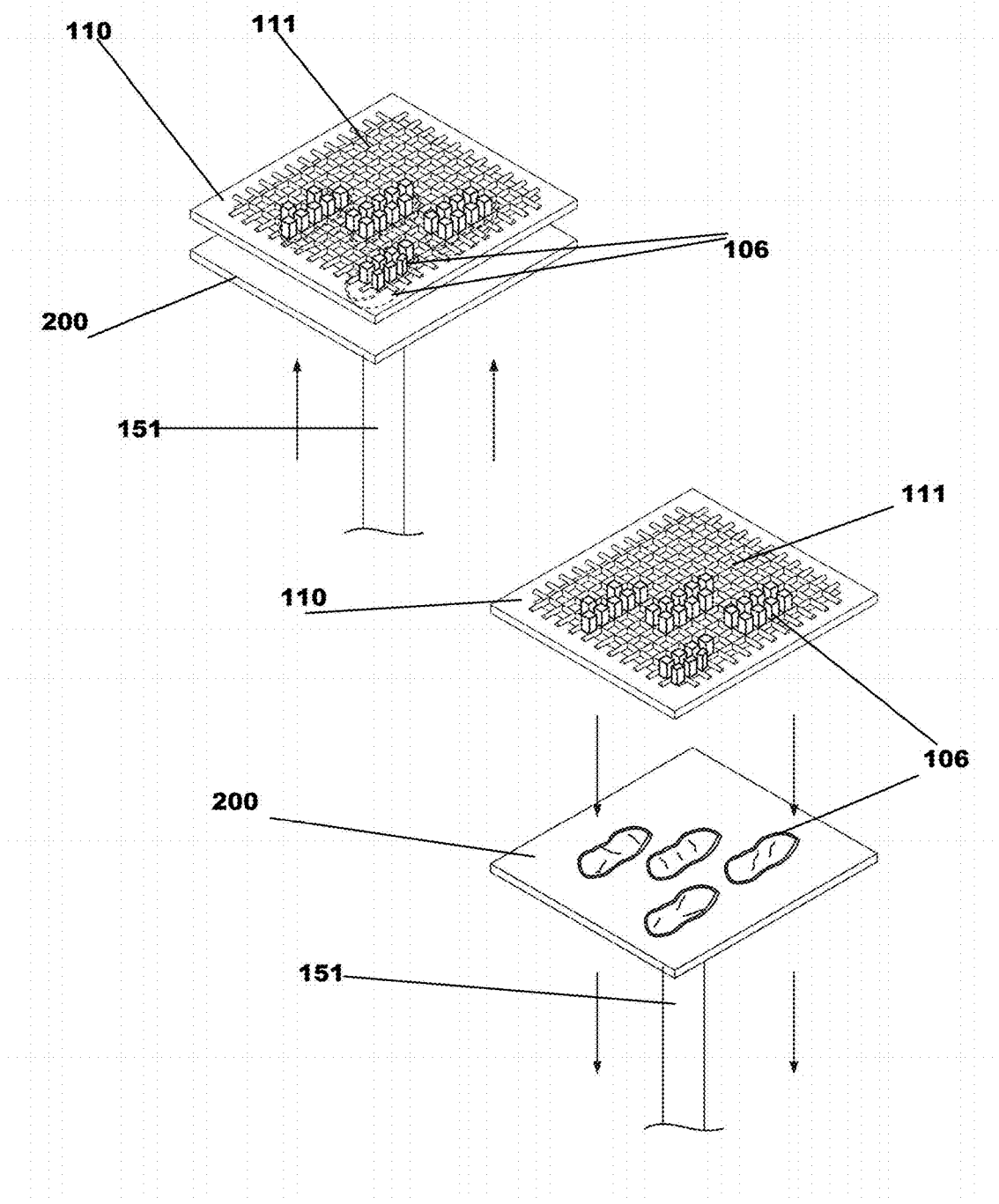

METHOD FOR SIMULTANEOUSLY PEELING AND CUTTING COOKED VEGETABLES

FIELD

The present invention relates to a potato peeler and cutter more specifically it relates to an improved electrically driven potatoes peeling and cutting device and even more specifically it relates to an electrically driven machine that cuts and peels cooked potatoes.

BACKGROUND

Heretofore, the dicing of potatoes has been a tedious task in that much hand cutting of peeled and cooked potatoes to dice and prepare for use in soups, chowders, salads and for frying, and the knives and blades which have been used are subjecting cooks to possible injury as in times of rush and making for a time consuming operation. The peeling of the raw potatoes is today machine done eliminating the use of knives for that purpose, while leaving the use of knives for the dicing of the potatoes with the result that uniformly-diced sizes are not obtained. Then, the knives still have to be cleaned, thereby further subjecting the cook to the possibility of being cut from knives.

While there are many types of household gadgets available for use in the preparation of food such as potato peelers, graters, and the like, there is presently no device that can perform both tasks of peeling and cutting of cooked potatoes simultaneously.

In prior art no device is available that can peel and cut cooked potatoes, it is therefore desirable to provide a processing machine that can be used to cut and peel the cooked potatoes and is easy to use.

SUMMARY OF THE EMBODIMENTS

The embodiments herein describe a system for peeling and cutting a cooked root vegetable having a frame to receive a cooked root vegetable and a surface slidably connected to the frame to move linearly and reciprocally along at least a portion of the length of the frame. The system also includes a wire assembly fixed to the frame. The wire assembly oriented perpendicular to the movement of the surface. The frame further includes means to move the surface toward the blade assembly. When the surface moves toward the wire assembly, it pushes the vegetable through the wire assembly which simultaneously cuts and removes the skin therefrom.

The embodiments further describe a method for peeling and cutting a cooked root vegetable including the step of placing a cooked root vegetable within a frame having front, rear and side surfaces so as to receive the root vegetable, and slidably connecting a surface to the frame to enable the surface to move linearly and reciprocally along at least a portion of the length of the frame. The method also includes fixing a wire assembly to the frame. The wire assembly is oriented perpendicular to the movement of the surface. The method further includes moving the surface toward the wire assembly so that when the surface moves toward the wire assembly, it pushes the vegetable through the wire assembly which simultaneously cuts and removes the skin from the vegetable.

A further embodiment described herein is a cooked root vegetable peeling and cutting device. The device includes a receptacle to receive a cooked root vegetable, a push arm to move the vegetable in a linear direction. The device also includes a wire assembly fixed to the receptacle and having at least a first wire positioned in a first direction and a second wire positioned in a second direction. The device further includes means to move the push arm toward the wire assembly. When activated, the push arm moves the vegetable in a linear direction toward and through the wire assembly which simultaneously cuts and peels the vegetable.

DESCRIPTION OF THE DRAWING FIGURES

FIG. 5 is an exploded perspective view of the first embodiment in use.

FIG. 6 is an exploded perspective view of the first embodiment in use.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
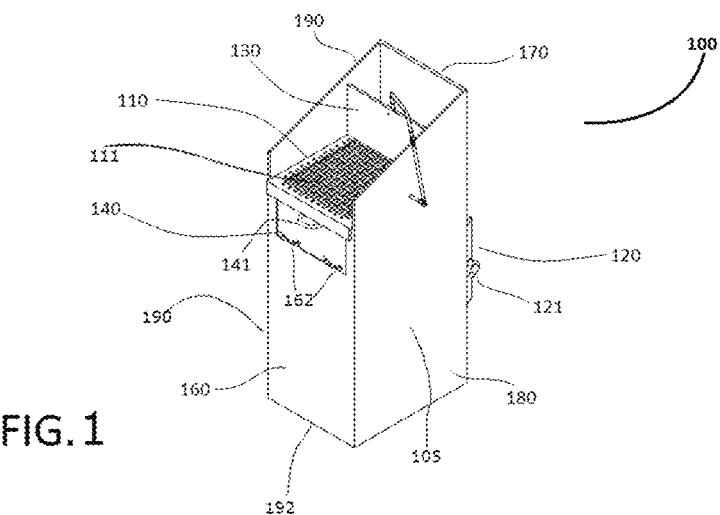
FIG. 1 is a perspective view of a first embodiment described herein.

FIG. 1 is a perspective view of a first embodiment 100 described herein. The embodiment 100 includes a main frame 105 having front wall 160, rear wall 170, and side walls 180, 190 and a floor 192. The main frame 105 can be formed either by folding a single sheet or by welding individual pieces to each other to form the main frame or can be joined by rivets, screws or other fastening device.

Access door 140 is pivotably connected to the main frame front wall 160 by means of hinges 162. The door 140 provides access to internal components and also to facilitate operation as will be described in detail below. The door 140 has a U-shaped handle 141.

Figure 2:
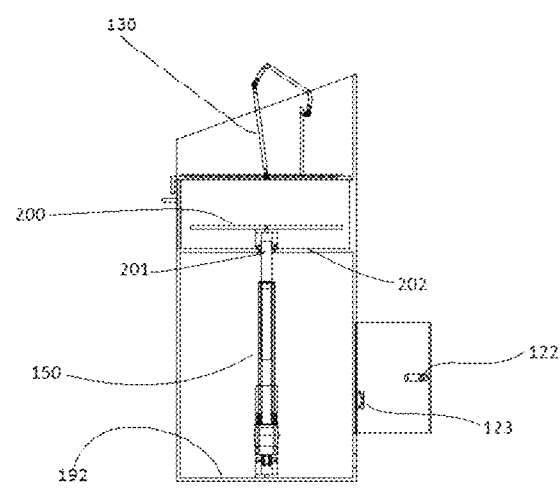
FIG. 2 is a side view of the embodiment of FIG. 1.

A second door 120 is hingedly connected to the rear wall 170 by means of hinge 123 as shown in FIG. 2. The second door 120 provides access to a linear actuator 150 which is described in more detail below. The second door 120 may be locked to the rear wall 170 by lock mechanism 122. The second door 120 also includes a handle 121 to facilitate opening and closing of the door.

A push plate 200 is fixedly connected to an actuator assembly 150. A catch plate 202 is located below the push plate 200. The catch plate is fixed to the front 160, rear 170, and side walls 180, 190 of the main frame 105. This can be accomplished by welding, or by mechanical fastening means such as bolts or screws. The catch plate 202 has a central opening therethrough 201. The opening 201 allows a portion of a linear actuator assembly 150 to pass through. The linear actuator assembly 150 will be described in more detail below.

A mesh plate 110 as shown in FIG. 1 is fixedly connected to the main frame 105 and oriented parallel to the push plate 200. The mesh plate 110 can be fixed to the main frame 105 by welding or other attachment means. It is also anticipated that the mesh plate 110 can be removably attached by sliding the mesh plate 110 into grooves (not shown) on the side walls 180, 190 of the main frame 105. The ability to remove the mesh plate aids in cleaning it. The mesh plate 110 is comprised of a series of wires 111 or thin blades oriented in a direction substantially perpendicular to one another and rigidly secured to the main frame 105.

A preferable mesh plate 110 is preferably made of a T-304 stainless steel woven wire mesh where the wire is welded together. The mesh is type 2 and the wire diameter is preferably 0.035 inches. The width of each opening is preferably about 0.465 inches. The preferably wire mesh has an 86.5% open area, weighs 0.161 lb./ft.$^2$ and has a density of about 0.290 lb./in.$^3$. This type of wire mesh is manufactured by Darby Wire Mesh (www.darbywiremesh.com), among others.

It should be noted that this preferable wire mesh plate 110 would vary depending upon the end product desired as well as the vegetable being processed. For example, to create potato cubes for soup or other dishes, the mesh wire described above would be preferred. However, to create a sweet potato cube or carrot cube may require a different size wire or different spacing of the wires or both.

A scraper plate assembly 130 is located above the mesh plate 110 and will be described in more detail below.

Figure 3:
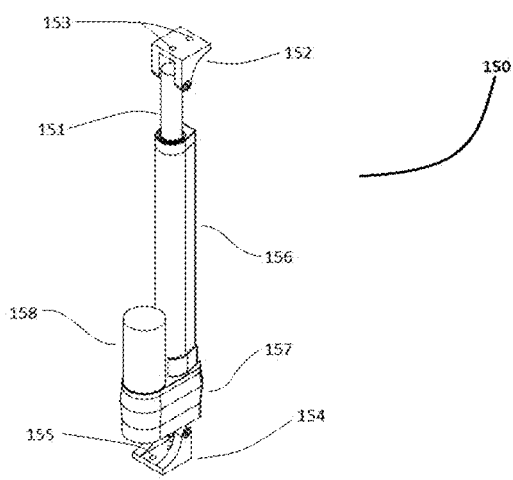
FIG. 3 is an isolated perspective view of the actuator assembly of the first embodiment of FIG. 1.

Turning now to FIG. 3, the linear actuator 150 assembly is shown. The actuator assembly 150 includes a rod 151 which is slidably received into a cylinder 156. The rod 151 moves vertically up and down with the power of an electric motor 158. A power transmission 157 joins the rod 151 and motor 158. The power transmission box receives electrical power from the electric motor 158 in the form of rotary motion, which it converts into linear motion and which it transmits to rod 151. The electrical motor 158 receives electrical power from an outside source. It is appreciated that while the linear actuator is described herein as being powered by an electric motor, other means may be used to move the rod 151 in a linear and reciprocating fashion. These include but are not limited to manual screw, cam, pneumatic, piezoelectric, and hydraulic means.

A bracket 152 is mounted on the top of rod 151 either by pin, nut bolt or other fastening means. Holes 153 are formed on the upper bracket 152 which are used to mount the push plate 200 either by rivets, pins nut bolts, or other fastening means. A corresponding lower bracket 154 is at the opposite end of the actuator assembly from the upper bracket 152. The lower bracket 154 has holes 155 which enable the actuator assembly 150 to be fixedly mounted onto the floor 192 of the main frame 105 by rivets, pins nut bolts or other fastening means.

Figure 4:
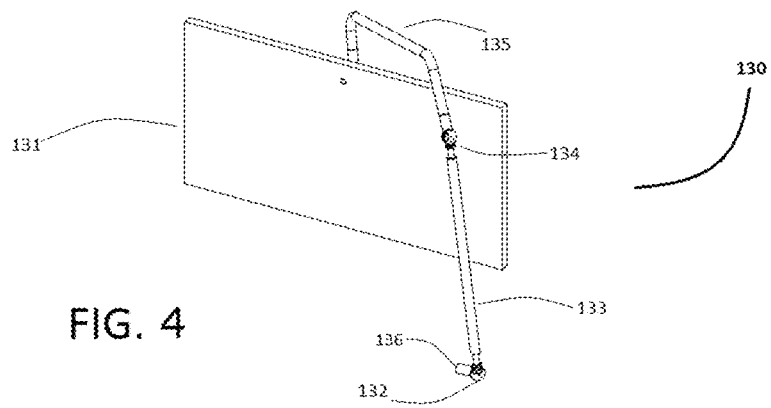
FIG. 4 is an isolated perspective view of the scraper plate assembly of the first embodiment of FIG. 1.

FIG. 4 shows an isolated view of the scraper plate assembly 130. The scraper plate assembly includes a scraper plate 131 fixedly attached to rods 135 and 133. A first swivel joints 134 is located between rods 135 and 133. A second swivel joint 132 is located on the open end of rod 133. An end piece 136 of the second swivel joint 132 is fixedly attached to side wall 180 by welding, screw threads or other attachment means, as shown in FIG. 1. The swivel joints 132, 134 enable the scraper plate 131 to move backwards and forwards and up and down adjacent to the mesh plate 110.

In use, a cooked potato or other root vegetable is placed into the first embodiment 100 between the mesh plate 110 and the push plate 200, as shown in FIG. 5. Preferably, the potato 106 is first cut in half and the cut surface is placed adjacent to the mesh plate 110. The actuator assembly 150 is energized so as to move the push plate 200 closer to the mesh plate 110. As it travels, the flesh of the potato 106 is pushed through the mesh plate 110 and between the wires 111, as shown in FIG. 6. As it does, the wires 111 cut the flesh as it passes through the wires. As the potato 106 moves through the wires 111 the scraper plate 131 moves in a direction substantially perpendicular to the direction of travel of the potato to the cut potato coming through the mesh plate 110. The cut pieces of the potato 106 then fall onto another surface such as a holding container or conveyor belt or the like (not shown). The potato 106 continues to be fed through the mesh plate 110 until all of the flesh has been fed through and the skin remains behind the mesh plate as the wire 111 cannot cut the skin in the same manner as the flesh. This enables the skin to be separated from the flesh and disposed of separately. It should be noted that an assembly of wires or blades cannot be too sharp because it if is too sharp, the skin of the potato would also be able to be cut and thus not separated from the flesh as described above.

Root vegetable as used herein shall include but not be limited to tuberous roots and taproots from non-roots such as tubers, rhizomes, corms, and bulbs. Such vegetables include but are not limited to potato, turnip, carrot, parsnip, celeriac, beet, rutabaga, radish, yam, yucca, ginger, pignut, earthnut, breadroot, mauka, and arrowroot.

The foregoing descriptions of the specific embodiments of the present invention have been presented for purposes of illustration and description. They are not intended to be exhaustive or to limit the embodiments to the precise forms disclosed, and obviously many modifications and variations are possible in light of the above teaching. The exemplary embodiments were chosen and described in order to best explain the principles of the invention and its practical applications and to thereby enable others skilled in the art to best utilize the invention and various embodiments with various modifications as are suited to the particular use contemplated.

Even though numerous characteristics and advantages of the embodiments and methods described in the foregoing description and figures, these descriptions are illustrative only. Changes may be made in detail, especially in matters of size, shape, and orientation of parts within the principles of the embodiments described herein to the full extent indicated by the broad general meaning of the terms in which the appended claims are attached. Furthermore, the terms "top", "bottom", "front", "rear", "left", "right", "side" and the like are used for purposes of illustration and are not designed to limit the scope of the embodiments described herein. Since numerous modifications and changes would occur to those skilled in the art, it is not desired to limit the scope of the embodiments described herein. Accordingly, all suitable modifications and equivalents may be resorted to, falling within the scope of the subject embodiments.

The invention claimed is:

1. A method for peeling, and cutting a cooked root vegetable comprising providing a cooked root vegetable having flesh and skin wherein same has been cut in half to provide cut surfaces; placing said cut in half and cooked root vegetable on a movable surface with the cut surface facing upward, said surface existing within a frame, said frame having front, rear and side surfaces so as to receive the cut in half and cooked root vegetable, said surface associated with the frame to enable said surface to move within the frame linearly and reciprocating along at least a portion of the height of the frame; fixing a mesh plate to the frame above said surface, the mesh plate oriented perpendicular to the movement of said surface; and providing power to enable said surface to move toward the mesh plate, whereby said surface moves the cut in half and cooked root vegetable through the mesh plate, such that said flesh of the cut in half and cooked vegetable is cut and the skin remains behind the mesh plate after all of said flesh has been fed through said mesh plate.

2. The method of claim 1 wherein the mesh plate is a wire assembly comprising at least a first wire oriented in a first direction and a second wire oriented in a second direction.

3. The method of claim 2 wherein the first and second directions are perpendicular.

4. The method of claim 1 wherein the surface comprises a plate connected to a linear actuator.

5. The method of claim 1 wherein the root vegetable comprises a potato.

\* \* \* \* \*